United States Patent
Cox et al.

(10) Patent No.: US 9,645,931 B2
(45) Date of Patent: *May 9, 2017

(54) FILTERING SNOOP TRAFFIC IN A MULTIPROCESSOR COMPUTING SYSTEM

(71) Applicant: International Business Machines Corporation, Armonk, NY (US)

(72) Inventors: Jason A. Cox, Raleigh, NC (US); M V V Anil Krishna, Cary, NC (US); Eric F. Robinson, Raleigh, NC (US); Brian M. Rogers, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/074,265

(22) Filed: Mar. 18, 2016

(65) Prior Publication Data
US 2016/0203079 A1    Jul. 14, 2016

Related U.S. Application Data

(63) Continuation of application No. 13/771,464, filed on Feb. 20, 2013, now Pat. No. 9,323,675.

(51) Int. Cl.
*G06F 12/08* (2016.01)
*G06F 12/12* (2016.01)
(Continued)

(52) U.S. Cl.
CPC ........ *G06F 12/0831* (2013.01); *G06F 12/084* (2013.01); *G06F 12/0811* (2013.01);
(Continued)

(58) Field of Classification Search
None
See application file for complete search history.

(56) References Cited

U.S. PATENT DOCUMENTS 5,625,793 A    4/1997  Mirza
5,926,830 A    7/1999  Feiste
(Continued)

OTHER PUBLICATIONS

Johnson, et al., "Run-Time Cache Bypassing", IEEE Transactions on Computers, Dec. 1999, pp. 1338-1354, vol. 48, No. 12, IEEE Computer Society, USA.
(Continued)

*Primary Examiner* — Edward Dudek, Jr.
*Assistant Examiner* — Ralph A Verderamo, III
(74) *Attorney, Agent, or Firm* — Brandon C. Kennedy; Steven Meyers; Kennedy Lenart Spraggins LLP

(57) ABSTRACT

Filtering snoop traffic in a multiprocessor computing system, each processor in the multiprocessor computing system coupled to a high level cache and a low level cache, the including: receiving a snoop message that identifies an address in shared memory targeted by a write operation; identifying a set in the high level cache that maps to the address in shared memory; determining whether the high level cache includes an entry associated with the address in shared memory; responsive to determining that the high level cache does not include an entry corresponding to the address in shared memory: determining whether the set in the high level cache has been bypassed by an entry in the low level cache; and responsive to determining that the set in the high level cache has not been bypassed by an entry in the low level cache, discarding the snoop message.

15 Claims, 5 Drawing Sheets

(51) Int. Cl.
    *G06F 12/0831* (2016.01)
    *G06F 12/0811* (2016.01)
    *G06F 12/128* (2016.01)
    *G06F 12/0817* (2016.01)
    *G06F 12/084* (2016.01)
    *G06F 12/0888* (2016.01)

(52) U.S. Cl.
    CPC ...... *G06F 12/0817* (2013.01); *G06F 12/0833* (2013.01); *G06F 12/0888* (2013.01); *G06F 12/128* (2013.01); *G06F 2212/1024* (2013.01); *G06F 2212/621* (2013.01); *G06F 2212/69* (2013.01)

(56) References Cited

U.S. PATENT DOCUMENTS

| | | | |
|---|---|---|---|
| 6,385,702 B1 | 5/2002 | Arimilli | |
| 2004/0039880 A1* | 2/2004 | Pentkovski | G06F 12/0811 711/146 |
| 2005/0138295 A1* | 6/2005 | Hammarlund | G06F 9/3824 711/137 |
| 2006/0143408 A1* | 6/2006 | Sistla | G06F 12/0811 711/145 |
| 2007/0038814 A1 | 2/2007 | Dieffenderfer | |
| 2008/0040555 A1 | 2/2008 | Iyer | |
| 2009/0182944 A1 | 7/2009 | Comparan | |
| 2010/0161904 A1 | 6/2010 | Cypher | |
| 2014/0156931 A1 | 6/2014 | Krick | |
| 2014/0156932 A1* | 6/2014 | Dundas | G06F 12/0862 711/122 |

OTHER PUBLICATIONS

Johnson, et al., "Run-Time Adaptive Cache Hierarchy Management via Reference Analysis", In Proceedings of the 24th annual international symposium on Computer Architecture (ISCA '97), Jun. 1997, pp. 315-326, ACM, New York, NY, USA.

Kharbutli et al., "Counter-Based Cache Replacement and Bypassing Algorithms", IEEE Transactions on Computers, Apr. 2008, pp. 433-447, vol. 57, No. 4, IEEE Computer Society, USA.

Stevens, "Introduction to AMBA 4 ACE", White Paper, arm.com (online), Jun. 6, 2011, [accessed Nov. 30, 2012], pp. 1-15, URL: http://www.arm.com/files/pdf/CacheCoherencyWhitepaper_6June2011.pdf.

* cited by examiner

FILTERING SNOOP TRAFFIC IN A MULTIPROCESSOR COMPUTING SYSTEM

CROSS-REFERENCE TO RELATED APPLICATION

This application is a continuation application of and claims priority from U.S. patent application Ser. No. 13/771,464, filed Feb. 20, 2013.

BACKGROUND

Field of the Invention

The field of the invention is data processing, or, more specifically, methods, apparatus, and products for filtering snoop traffic in a multiprocessor computing system.

Description of Related Art

When a uniprocessor makes a request for a piece of data, the data is initially supplied by the main memory and along the way it is stored in the cache hierarchy—such as the L2 cache and the L1 cache. Future accesses to the same (or nearby) data can typically be satisfied by the caches.

In multicore and multiprocessor systems that support the shared memory programming model, multiple execution threads may work on the same shared data, and, therefore, multiple caches may hold the same cache line of data. In a shared memory programming model it is possible that the same piece of data (that is data located at a unique location in memory) be simultaneously in use by multiple processors. When there are multiple copies of a block of data in the caches it is imperative that some form of cache coherence is implemented in order to propagate any update to any piece of shared data to all the users of that data. One approach to maintaining cache coherence involves simply invalidating all other replicas of a cache line in the system whenever one processor intends to modify the cache line. This ensures that only one cached copy of the line remains in the system, which may then be safely modified. Later, if other processors in the system want to use that same cacheline again, they are forced to fetch the modified copy, thereby ensuring correctness.

In order to invalidate all other replicas of a cache line in the system whenever one processor intends to modify the cache line, a snoop message may be issued by the processor intends to modify the cache line. The snoop message may be received by all other processors in the system and the cache line that is to be modified may be searched for in the L2 cache and the L1 cache—causing a performance bottleneck as all snoop messages require multiple cache accesses.

SUMMARY

Methods, apparatus, and products for filtering snoop traffic in a multiprocessor computing system, each processor in the multiprocessor computing system coupled to a high level cache and a low level cache, including: receiving, by a cache controller, a snoop message, wherein the snoop message identifies an address in shared memory targeted by a write operation; identifying, by the cache controller, a set in the high level cache that maps to the address in shared memory, wherein the set includes all locations in the high level cache for an entry associated with the address in shared memory; determining, by the cache controller, whether the high level cache includes an entry associated with the address in shared memory; responsive to determining that the high level cache does not include an entry corresponding to the address in shared memory: determining, by the cache controller, whether the set in the high level cache has been bypassed by an entry in the low level cache; and responsive to determining that the set in the high level cache has not been bypassed by an entry in the low level cache, discarding, by the cache controller, the snoop message.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION

Figure 1:
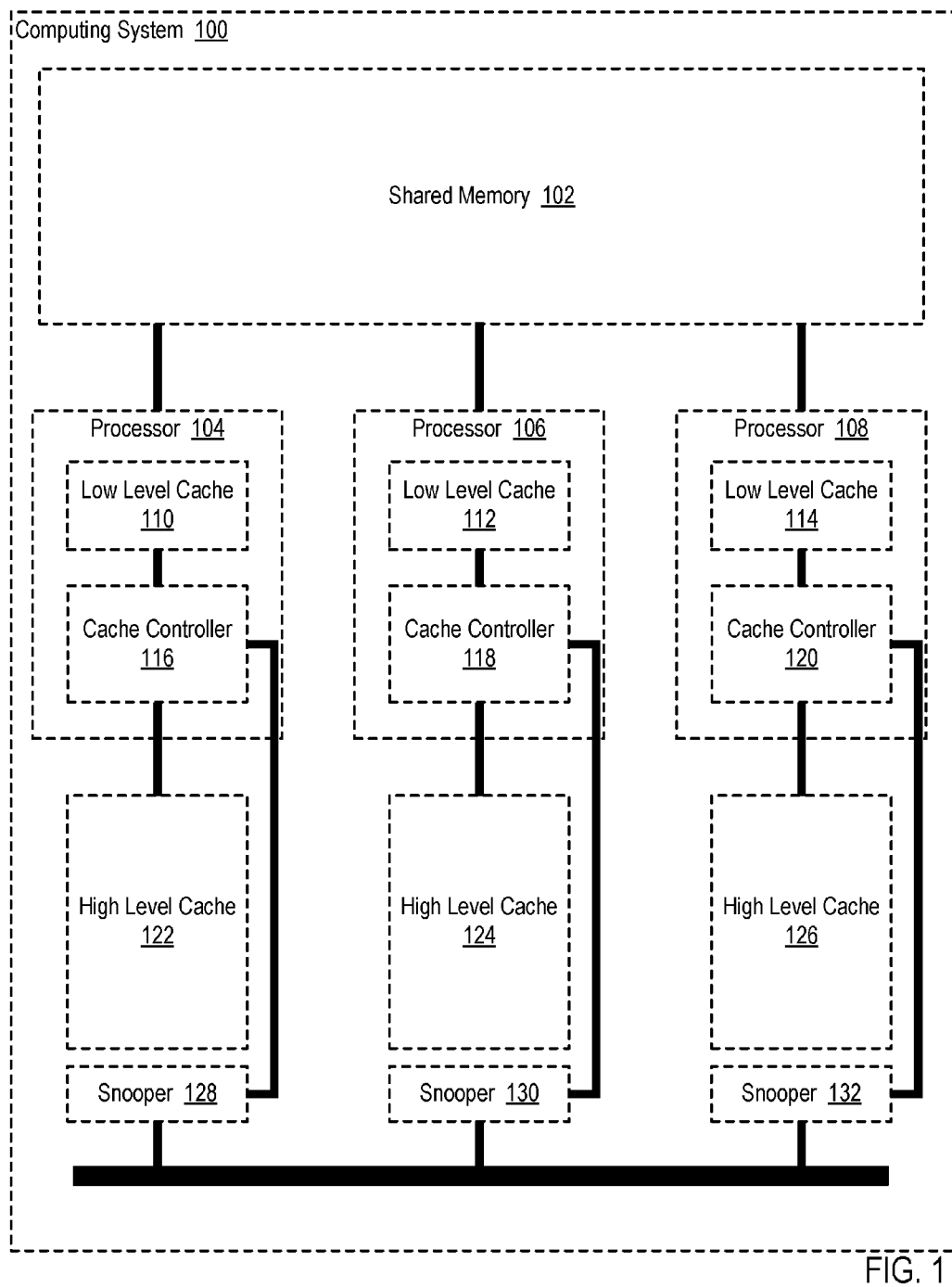
FIG. 1 sets forth a block diagram of automated computing machinery comprising an example multiprocessor computing system with snoop traffic filtering according to embodiments of the present invention.

Example methods, apparatus, and products for filtering snoop traffic in a multiprocessor computing system in accordance with the present invention are described with reference to the accompanying drawings, beginning with FIG. 1. FIG. 1 sets forth a block diagram of automated computing machinery comprising an example multiprocessor computing system (100) with snoop traffic filtering according to embodiments of the present invention. The multiprocessor computing system (100) of FIG. 1 includes a plurality of processors (104, 106, 108), although embodiments of the present application could include multiple processing cores.

In the multiprocessor computing system (100) of FIG. 1, each processor (104, 106, 108) is coupled to shared memory (102). The shared memory (102) is the principal, random access store of program data and program instructions for data processing on the multiprocessor computing system (100). The shared memory (102) implements a single extent of physical address space shared among the processors (104, 106, 108).

In the multiprocessor computing system (100) of FIG. 1, each processor (104, 106, 108) in the multiprocessor computing system (100) is further coupled to a high level cache (122, 124, 126) and a low level cache (110, 112, 114). The low level cache (110, 112, 114) of FIG. 1 is illustrated as being on-chip cache and the high level cache (122, 124, 126) of FIG. 1 is illustrated as being off-chip cache. Readers will appreciate that the high level cache (122, 124, 126) and a low level cache (110, 112, 114) could be off-chip cache or on-chip cache according to embodiments of the present invention, so long as the caches are part of a cache hierarchy.

In the example of FIG. 1, the low level cache (110, 112, 114) can serve as an L1 cache in a cache hierarchy and the high level cache (122, 124, 126) can serve as an L2 cache in the cache hierarchy.

The low level caches (110, 112, 114) and the high level caches (122, 124, 126) are specialized segments of memory used by the processors (104, 106, 108) to reduce memory access latency. Each cache (110, 112, 114, 122, 124, 126) is smaller and faster than the shared memory (102), and each cache (110, 112, 114, 122, 124, 126) stores copies of data from frequently used shared memory (102). When a processor (104, 106, 108) needs to read from or write to a location in shared memory (102), the processor (104, 106, 108) first checks whether a copy of that data, a "cache line," is in a cache (110, 112, 114, 122, 124, 126). Because the multiprocessor computing system (100) of FIG. 1 implements a cache hierarchy, when a processor (104, 106, 108) needs to read from or write to a location in shared memory (102), the processor (104, 106, 108) first checks its low level cache (110, 112, 114) to determine if the low level cache (110, 112, 114) includes the requested data. If the low level cache (110, 112, 114) does not include the requested data, the processor (104, 106, 108) subsequently checks its high level cache (122, 124, 126) to determine if the high level cache (122, 124, 126) includes the requested data. If the requested data is in a cache (110, 112, 114, 122, 124, 126), the processor (104, 106, 108) immediately reads from or writes to the cache (110, 112, 114, 122, 124, 126), which is much faster than reading from or writing to shared memory (102).

Cache memory is organized in blocks of data referred to as 'cache lines.' Each cache line in different designs may range in size from 8 to 512 bytes or more. The size of a cache line typically is larger than the size of the usual access requested by a CPU instruction, which ranges from 1 to 16 bytes—the largest addresses and data typically handled by current 32 bit- and 64 bit-architectures being 128 bits or 16 bytes in length. Each cache line is characterized by a 'tag' composed of most significant bits of the beginning address where the contents of the cache line are stored in shared memory (102). The example multiprocessor computing system (100) of FIG. 1 implements two cache levels, but this is only for ease of explanation, not for limitation. Many computers implement additional levels of cache, three or even four cache levels.

In the multiprocessor computing system (100) of FIG. 1, each processor (104, 106, 108) in the multiprocessor computing system (100) is also coupled to a cache controller (116, 118, 120). Each cache controller (116, 118, 120) of FIG. 1 may be embodied, for example, as a module of automated computing machinery configured to manage the caches. The cache controller (116, 118, 120) may carry out functions such as, for example, inserting entries into the caches, invalidating entries in the caches, evicting entries from the caches, reading data from the caches, managing coherency between the caches, and so on.

The cache controllers (116, 118, 120) can include a cache directory that is a repository of information regarding cache lines in the caches. The directory records, for each cache line in all of the caches in the computer, the identity of the cache line or cache line "tag," the cache line state, MODIFIED, SHARED, INVALID, and so on, and a bit vector that specifies for each processor whether a copy of a cache line in a low level shared cache is stored in an upper cache level. The cache controllers (116, 118, 120) consult and update the information in the cache directory with every cache operation. Each cache controller (116, 118, 120) may be embodied as a logic circuit that manages cache memory and provides an interface among processors, caches, and shared memory.

The multiprocessor computing system (100) of FIG. 1 also includes a plurality of snoopers (128, 130, 132). In the example method of FIG. 1, the snooper may be embodied as automated computing machinery operatively coupled to the memory interconnect and also operatively coupled to the cache controller (116, 118, 120) of a processor (104, 106, 108). Each snooper (128, 130, 132) may be configured to monitor a data communications interconnect that couples each of the snoopers (128, 130, 132) for data communications. In such a way, the cache controllers (116, 118, 120) may receive the snoop messages via the snoopers (128, 130, 132).

The cache controllers (116, 118, 120) of FIG. 1 can filter snoop traffic according to embodiments of the present invention by receiving a snoop message. A snoop message is a message that may be broadcast by a particular processor (104, 106, 108) to assist in maintaining cache coherency in the caches of each processor (104, 106, 108). The snoop message may be broadcast by a particular processor (104, 106, 108), for example, when the processor (104, 106, 108) is writing data to an address in shared memory (102). Because the processor (104, 106, 108) is writing data to an address in shared memory (102), any corresponding entry maintained in the cache of a processor (104, 106, 108) should be invalidated or otherwise evicted because the cache entry no longer represents the current state of the shared memory (102). The snoop message may therefore identify an address in shared memory (102) that is targeted by a write operation. In the example of FIG. 1, a snoop message may first be detected by a snooper (128, 130, 132) that monitors a memory interconnect that connects the processors (104, 106, 108) in the multiprocessor computing system (100).

The cache controllers (116, 118, 120) of FIG. 1 can further filter snoop traffic according to embodiments of the present invention by identifying a set in the high level cache (122, 124, 126) that maps to the address in shared memory (102) that is identified in the snoop message. The high level caches (122, 124, 126) may be embodied as a set associative cache such as a 2-way set associative cache, a 4-way set associative cache, an 8-way set associative cache, and so on. In such an example, each 'way' represents a location in the high level cache (122, 124, 126) that can contain an entry associated with a particular address. In a 2-way set associative high level cache (122, 124, 126), for example, an entry associated with a particular address can be located in one of two locations, whereas in an 8-way set associative high level cache (122, 124, 126) an entry associated with a particular address can be located in one of eight locations. A set in the high level cache (122, 124, 126) therefore includes all locations in the high level cache (122, 124, 126) for an entry associated with a particular address, such as the address in shared memory (102) that is targeted by a write operation.

The cache controllers (116, 118, 120) of FIG. 1 can further filter snoop traffic according to embodiments of the present invention by determining whether the high level cache (122, 124, 126) includes an entry associated with the address in shared memory (102) that is identified in the snoop message. Determining whether the high level cache (122, 124, 126) includes an entry associated with the address in shared memory (102) identified in the snoop message may be carried out, for example, by searching each way in the set that the address maps to and determining whether any way in such a set includes an entry associated with the address in shared memory (102). When a cache controller (116, 118, 120) determines that the high level cache (122, 124, 126)

includes an entry associated with the address in shared memory (102) identified in the snoop message, the cache controller (116, 118, 120) will need to invalidate and evict this entry in the high level cache (122, 124, 126) in response to the snoop message, as the entry in the high level cache (122, 124, 126) no longer represents the current state of the address in shared memory (102) by virtue of a processor (104, 106, 108) writing to the address in shared memory (102).

The cache controllers (116, 118, 120) of FIG. 1 can further filter snoop traffic according to embodiments of the present invention by determining whether the set in the high level cache (122, 124, 126) has been bypassed by an entry in the low level cache (110, 112, 114). A set in the high level cache (122, 124, 126) has been bypassed by an entry in the low level cache (110, 112, 114) when inserting an entry in the low level cache (110, 112, 114) does not also result in inserting an entry in the high level cache (122, 124, 126), as is required in an inclusive high level cache (122, 124, 126) that includes a copy of all data that is in the low level cache (110, 112, 114). In such an example, certain types of data may bypass the high level cache (122, 124, 126) while other types of data do not bypass the high level cache (122, 124, 126). For example, data that is part of a media stream may bypass the high level cache (122, 124, 126) as the data is likely to be used once and subsequently evicted from the low level cache (110, 112, 114). In such an example, there is minimal benefit to also inserting a copy of the data in the high level cache (122, 124, 126) that will also be evicted shortly.

The cache controllers (116, 118, 120) of FIG. 1 can further filter snoop traffic according to embodiments of the present invention by determining whether the set in the high level cache (122, 124, 126) has been bypassed by an entry in the low level cache (110, 112, 114) is carried out in response to determining that the high level cache (122, 124, 126) does not include an entry corresponding to the address in shared memory (102) identified in the snoop message. Because the high level cache (122, 124, 126) does not include an entry corresponding to the address in shared memory (102), the low level cache (110, 112, 114) will also not include an entry corresponding to the address in shared memory (102) unless the high level cache (122, 124, 126) was bypassed.

In the example method of FIG. 1, determining whether the set in the high level cache (122, 124, 126) has been bypassed by an entry in the low level cache (110, 112, 114) may be carried out, for example, through the use of a special purpose bit that is associated with each set in the high level cache (122, 124, 126). Each set in the high level cache (122, 124, 126) can include flag bits that are associated with the entries within the set. For example, the high level cache (122, 124, 126) can include a valid bits and dirty bits. The value in each bit can be used to determine the state of entries within the associated set in the high level cache (122, 124, 126). Each set can also include an additional control bit, referred to herein as a 'set bypassed' bit.

In the example method of FIG. 1, each set in the high level cache (122, 124, 126) can include an associated set bypassed bit. The set bypassed bit associated with each set in the high level cache (122, 124, 126) can be initialized to a value of 0, indicating that set in the high level cache (122, 124, 126) has not been bypassed by an entry in the low level cache (110, 112, 114). If the cache controller (116, 118, 120) receives an instruction to insert data stored at a particular address in shared memory (102) into the low level cache (110, 112, 114), without inserting the data into the high level cache (122, 124, 126), the set in the high level cache (122, 124, 126) that maps to the address of the data in shared memory (102) has been bypassed. In such an example, the cache controller (116, 118, 120) can change the value of the set bypassed bit of the associated set in the high level cache (122, 124, 126) to a value of 1, indicating that the set in the high level cache (122, 124, 126) has been bypassed by an entry in the low level cache (110, 112, 114). In such an example, determining whether the set in the high level cache (122, 124, 126) has been bypassed by an entry in the low level cache (110, 112, 114) may be carried out by inspecting the set bypassed bit of the set that is associated with the address in shared memory (102) that is identified in the snoop message.

The cache controllers (116, 118, 120) of FIG. 1 can further filter snoop traffic according to embodiments of the present invention by discarding the snoop message. Discarding the snoop message is carried out in response to determining that the set in the high level cache (122, 124, 126) has not been bypassed by an entry in the low level cache (110, 112, 114). In such an example, because the cache controller (116, 118, 120) has determined that the high level cache (122, 124, 126) does not includes an entry associated with the address in shared memory (102) that is identified in the snoop message, and because the cache controller (116, 118, 120) has also determined that the set in the high level cache (122, 124, 126) has not been bypassed by an entry in the low level cache (110, 112, 114), the cache controller (116, 118, 120) has ensured that the low level cache (110, 112, 114) does not include an entry that is associated with the address in shared memory (102) that is identified in the snoop message. As such, no further processing of the snoop message is needed as there is no entry in the low level cache (110, 112, 114) that will be evicted in response to the snoop message. The cache controller (116, 118, 120) is therefore free to discard the snoop message.

Figure 2:
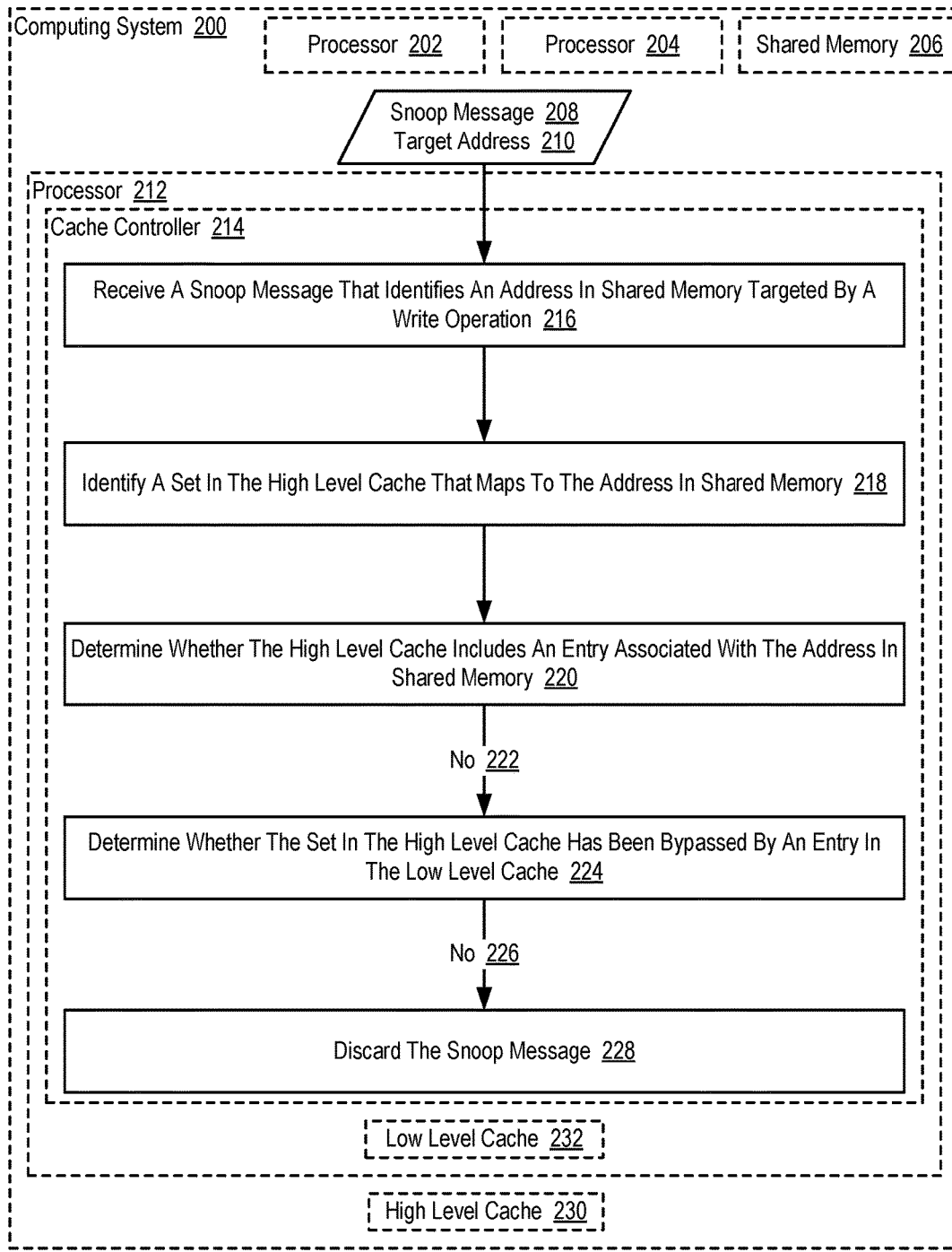
FIG. 2 sets forth a flow chart illustrating an example method for filtering snoop traffic in a multiprocessor computing system according to embodiments of the present invention.

For further explanation, FIG. 2 sets forth a flow chart illustrating an example method for filtering snoop traffic in a multiprocessor computing system (200) according to embodiments of the present invention. In the example method of FIG. 2, each processor (202, 204, 212) in the multiprocessor computing system (200) is coupled to a low level cache (232) and a high level cache (230), although FIG. 2 does not explicitly depict the high level cache and the lower level cache for two of the processors (202, 204). The low level cache (232) of FIG. 1 may be embodied, for example, as an L1 cache that is located on the processor (212) itself. The high level cache (230) of FIG. 1 may be embodied, for example, as an L2 cache that is located on the same motherboard (not shown) as the processor (212). In such an example, the low level cache (232) may include a smaller amount of memory that the high level cache (230), however, the low level cache (232) may be accessed by the processor (212) more quickly than the high level cache (230). In the example method of FIG. 2, each processor (202, 204, 212) in the multiprocessor computing system (200) also includes a cache controller (214) for controller the operation of the low level cache (232) and the high level cache (230), although FIG. 2 does not explicitly depict the cache controllers for two of the processors (202, 204).

The example method of FIG. 2 includes receiving (216), by the cache controller (214), a snoop message (208). In the example method of FIG. 2, a snoop message (208) is a message that may be broadcast by a particular processor (202, 204, 212) to assist in maintaining cache coherency in the caches of each processor (202, 204, 212). The snoop message (208) may be broadcast by a particular processor (202), for example, when the processor (202) is writing data to an address in shared memory (206). Because the processor (202) is writing data to an address in shared memory (206), any corresponding entry maintained in the cache of a processor (202, 204, 212) should be evicted the cache entry no longer represents the current state of the shared memory (206). The snoop message (208) of FIG. 2 may therefore identify an address (210) in shared memory (206) that is targeted by a write operation.

In the example method of FIG. 2, a snoop message (208) may first be detected by a snooper that monitors a memory interconnect that connects the processors (202, 204, 212) in the multiprocessor computing system (200). Although not illustrated in FIG. 2, each processor (202, 204, 212) may have an associated snooper. The snooper may be embodied as automated computing machinery operatively coupled to the memory interconnect and also operatively coupled to the cache controller (214) of a processor (212). In such a way, the cache controller (214) may receive (216) the snoop message (208) via the snooper.

The example method of FIG. 2 also includes identifying (218), by the cache controller (214), a set in the high level cache (230) that maps to the address (210) in shared memory (206). In the example method of FIG. 2, the high level cache (230) a set associative cache such as a 2-way set associative cache, a 4-way set associative cache, an 8-way set associative cache, and so on. In such an example, each 'way' represents a location in the high level cache (230) that can contain an entry associated with a particular address. In a 2-way set associative high level cache (230), for example, an entry associated with a particular address can be located in one of two locations, whereas in an 8-way set associative high level cache (230) an entry associated with a particular address can be located in one of eight locations. A set in the high level cache (230) therefore includes all locations in the high level cache (230) for an entry associated with a particular address, such as the address (210) in shared memory (206) that is targeted by a write operation. Identifying (218) a set in the high level cache (230) that maps to the address (210) in shared memory (206) may be carried out, for example, by applying an indexing algorithm to the address (210). For example, the indexing algorithm may identify the set that an address (210) maps to by using the lease significant bits of the address (210), by using a predetermined set of bits in the address (210), and so on.

The example method of FIG. 2 also includes determining (220), by the cache controller (214), whether the high level cache (230) includes an entry associated with the address (210) in shared memory (206). In the example method of FIG. 2, determining (220) whether the high level cache (230) includes an entry associated with the address (210) in shared memory (206) may be carried out, for example, by searching each way in the set that the address (210) maps to and determining whether any way in such a set includes an entry associated with the address (210) in shared memory (206). When the cache controller (214) determines that the high level cache (230) includes an entry associated with the address (210) in shared memory (206), the cache controller (214) will need to invalidate and evict this entry in the high level cache (230) in response to the snoop message (208), as the entry in the high level cache (230) no longer represents the current states of the address (210) in shared memory (206) by virtue of another processor (202, 204) writing to the address (210) in shared memory (206).

The example method of FIG. 2 also includes determining (224), by the cache controller (214), whether the set in the high level cache (230) has been bypassed by an entry in the low level cache (232). In the example method of FIG. 2, a set in the high level cache (230) has been bypassed by an entry in the low level cache (232) when inserting an entry in the low level cache (232) does not also result in inserting an entry in the high level cache (230), as is required in an inclusive high level cache (230) that includes a copy of all data that is in the low level cache (232). In such an example, certain types of data may bypass the high level cache (230) while other types of data do not bypass the high level cache (230). For example, data that is part of a media stream may bypass the high level cache (230) as the data is likely to be used once and subsequently evicted from the low level cache (232). In such an example, there is minimal benefit to also inserting a copy of the data in the high level cache (230) that will also be evicted shortly.

In the example method of FIG. 2, determining (224) whether the set in the high level cache (230) has been bypassed by an entry in the low level cache (232) is carried out in response to determining that the high level cache (230) does not (222) include an entry corresponding to the address (210) in shared memory (206). Because the high level cache (230) does not (222) include an entry corresponding to the address (210) in shared memory (206), the low level cache (232) will also not include an entry corresponding to the address (210) in shared memory (206) unless the high level cache (230) was bypassed.

In the example method of FIG. 2, determining (224) whether the set in the high level cache (230) has been bypassed by an entry in the low level cache (232) may be carried out, for example, through the use of a special purpose bit that is associated with each set in the high level cache (230). In the example method of FIG. 2, each set in the high level cache (230) can include flag bits that are associated with the entries within the set. For example, the high level cache (230) can include a valid bits and dirty bits. The value in each bit can be used to determine the state of entries within the associated set in the high level cache (230). In the example method of FIG. 2, each set can also include an additional control bit, referred to herein as a 'set bypassed' bit.

In the example method of FIG. 2, each set in the high level cache (230) can include an associated set bypassed bit. The set bypassed bit associated with each set in the high level cache (230) can be initialized to a value of 0, indicating that set in the high level cache (230) has not been bypassed by an entry in the low level cache (232). If the cache controller (214) receives an instruction to insert data stored at a particular address in shared memory (206) into the low level cache (232), without inserting the data into the high level cache (230), the set in the high level cache (230) that maps to the address of the data in shared memory (206) has been bypassed. In such an example, the cache controller (214) can change the value of the set bypassed bit of the associated set in the high level cache (230) to a value of 1, indicating that the set in the high level cache (230) has been bypassed by an entry in the low level cache (232). In such an example, determining (224) whether the set in the high level cache (230) has been bypassed by an entry in the low level cache (232) may be carried out by inspecting the set bypassed bit of the set that is associated with the address (210) in shared memory (206) that is identified in the snoop message (208).

The example method of FIG. 2 also includes discarding (228), by the cache controller (214), the snoop message (208). In the example method of FIG. 2, discarding (228) the snoop message (208) is carried out in response to determining that the set in the high level cache (230) has not (226) been bypassed by an entry in the low level cache (232). In such an example, because the cache controller (214) has determined (220) that the high level cache (230) does not (222) includes an entry associated with the address (210) in shared memory (206) and the cache controller (214) has also determined (224) that the set in the high level cache (230) has not (226) been bypassed by an entry in the low level cache (232), the cache controller (214) has ensured that the low level cache (232) does not include an entry that is associated with the address (210) in shared memory (206) that is identified in the snoop message (208). As such, no further processing of the snoop message (208) is needed as there is no entry in the low level cache (232) that will be evicted in response to the snoop message (208). The cache controller is therefore free to discard (228) the snoop message (208).

Figure 3:
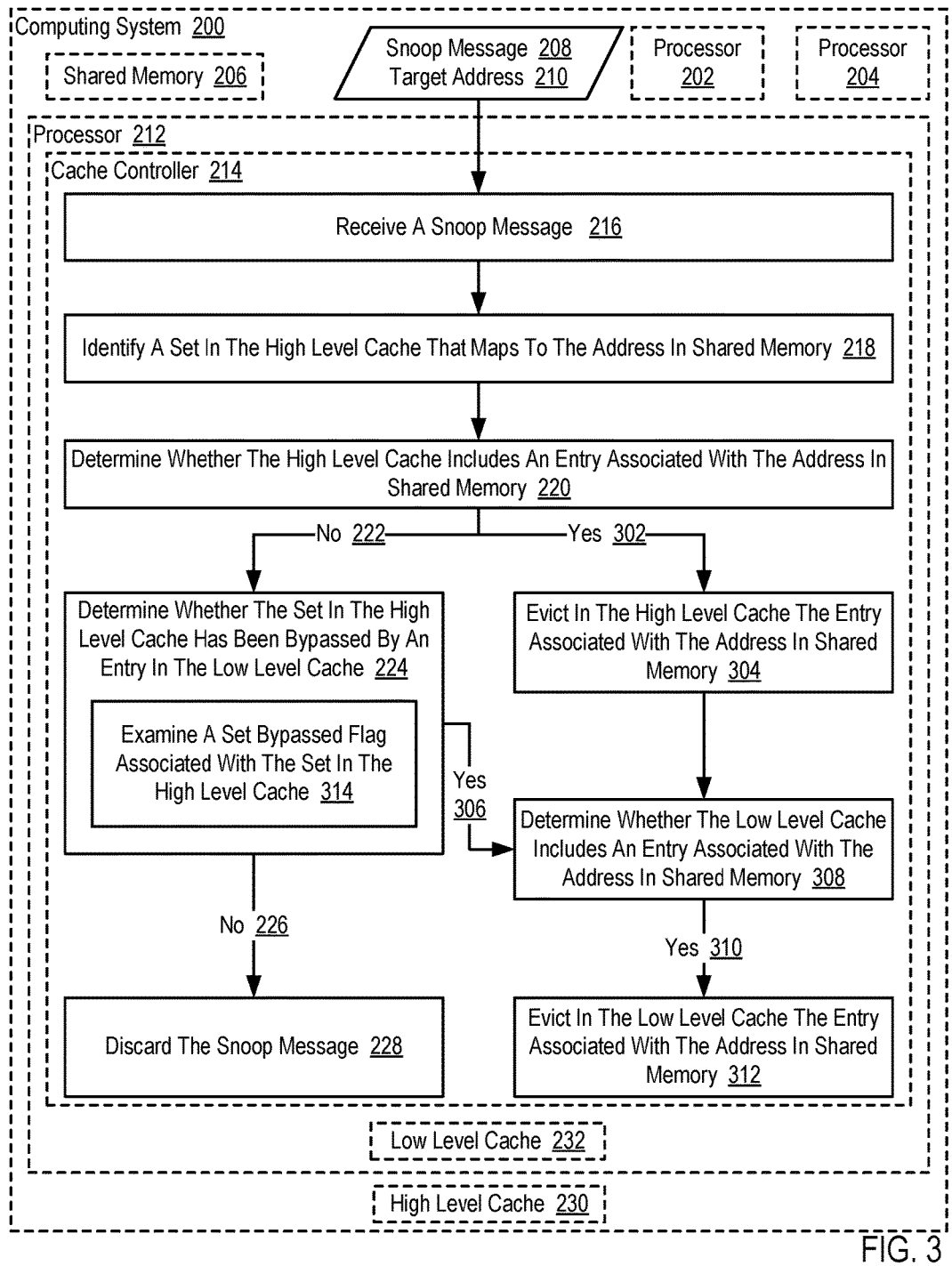
FIG. 3 sets forth a flow chart illustrating an example method for filtering snoop traffic in a multiprocessor computing system according to embodiments of the present invention.

For further explanation, FIG. 3 sets forth a flow chart illustrating an example method for filtering snoop traffic in a multiprocessor computing system (200) according to embodiments of the present invention. The example method of FIG. 3 is similar to the example method of FIG. 2, as it also includes receiving (216) a snoop message (208), identifying (218) a set in the high level cache (230) that maps to the address (210) in shared memory (206), determining (220) whether the high level cache (230) includes an entry associated with the address (210) in shared memory (206), determining (224) whether the set in the high level cache (230) has been bypassed by an entry in the low level cache (232), and discarding (228) the snoop message (208).

In the example method of FIG. 3, determining (224) whether the set in the high level cache (230) has been bypassed by an entry in the low level cache (232) can include examining (314), by the cache controller (214), a set bypassed flag associated with the set in the high level cache (230). The set bypassed bit associated with each set in the high level cache (230) can be initialized to a value of 0, indicating that set in the high level cache (230) has not been bypassed by an entry in the low level cache (232). If the cache controller (214) receives an instruction to insert data stored at a particular address in shared memory (206) into the low level cache (232), without inserting the data into the high level cache (230), the set in the high level cache (230) that maps to the address of the data in shared memory (206) has been bypassed. In such an example, the cache controller (214) can change the value of the set bypassed bit of the associated set in the high level cache (230) to a value of 1, indicating that the set in the high level cache (230) has been bypassed by an entry in the low level cache (232). In such an example, determining (224) whether the set in the high level cache (230) has been bypassed by an entry in the low level cache (232) may be carried out by examining (314) a set bypassed flag associated with the set in the high level cache (230) that is associated with the address (210) in shared memory (206) that is identified in the snoop message (208).

The example method of FIG. 3 also includes evicting (304), by the cache controller (214), in the high level cache (230) the entry associated with the address (210) in shared memory (206). In the example method of FIG. 3, evicting (304) the entry in the high level cache (230) that is associated with the address (210) in shared memory (206) is carried out in response to affirmatively (302) determining that the high level cache (230) includes an entry associated with the address (210) in shared memory (206). As described above, the snoop message (208) can identify an address (210) in the shared memory (206) that is targeted by a write operation initiated by another processor (202, 204), such that the processor (212) receives the snoop message (208) should evict any entries in its cache (230, 232) that are associated with the address (210) in shared memory (206). When the cache controller (214) affirmatively (302) determines (220) that the high level cache (230) includes an entry associated with the address (210) in shared memory (206), the cache controller (214) will therefore evict (304) the entry associated with the address (210) in shared memory (206) from the high level cache (230). In the example method of FIG. 3, evicting (304) the entry associated with the address (210) in shared memory (206) from the high level cache (230) may be carried out, for example, by making the location in the high level cache (230) that contains the entry associated with the address (210) in shared memory (206) available for receiving other entries, by setting a valid flag to a value indicating the entry associated with the address (210) in shared memory (206) is invalid, and so on.

The example method of FIG. 3 also includes determining (308), by the cache controller (214), whether the low level cache (232) includes an entry associated with the address (210) in shared memory (206). In the example method of FIG. 3, determining (308) whether the low level cache (232) includes an entry associated with the address (210) in shared memory (206) may be carried out, for example, by searching each way in the low level cache (232) that the address (210) maps to and determining whether any an entry is associated with the address (210) in shared memory (206). When the cache controller (214) determines that the low level cache (232) includes an entry associated with the address (210) in shared memory (206), the cache controller (214) will need to invalidate and evict this entry in the low level cache (232) in response to the snoop message (208), as the entry in the low level cache (232) no longer represents the current states of the address (210) in shared memory (206) by virtue of another processor (202, 204) writing to the address (210) in shared memory (206).

The example method of FIG. 3 also includes evicting (312) in the low level cache (232) the entry associated with the address (210) in shared memory (206). In the example method of FIG. 3, evicting (312) in the low level cache (232) the entry associated with the address (210) in shared memory (206) is carried out in response to affirmatively (310) determining (308) that the low level cache (232) includes an entry associated with the address (210) in shared memory (206). As described above, the snoop message (208) can identify an address (210) in the shared memory (206) that is targeted by a write operation initiated by another processor (202, 204), such that the processor (212) receives the snoop message (208) should evict any entries in its cache (230, 232) that are associated with the address (210) in shared memory (206). When the cache controller (214) affirmatively (310) determines (308) that the low level cache (232) includes an entry associated with the address (210) in shared memory (206), the cache controller (214) will therefore evict (312) the entry associated with the address (210) in shared memory (206) from the low level cache (232). In the example method of FIG. 3, evicting (312) the entry associated with the address (210) in shared memory (206) from the low level cache (232) may be carried out, for example, by making the location in the low level cache (232) that contains the entry associated with the address (210) in shared memory (206) available for receiving other entries, by setting a valid flag to a value indicating the entry associated with the address (210) in shared memory (206) is invalid, and so on.

In the example method of FIG. 3, determining (308), by the cache controller (214), whether the low level cache (232) includes an entry associated with the address (210) in shared memory (206) may alternatively be carried out in response to affirmatively (306) determining (224) that the set in the high level cache (230) has been bypassed by an entry in the low level cache (232). In the example method of FIG. 3, even when it has been determined (220) that the high level cache (230) does not (222) include an entry associated with the address (210) in shared memory (206), the low level cache (232) may still include an entry associated with the address (210) in shared memory (206) in the event that the set in the high level cache (230) that maps the address (210) in shared memory (206) has been bypassed. As such, if the cache controller (214) affirmatively (306) determines (224) that the set in the high level cache (230) that maps to the address (210) in shared memory (206) has been bypassed by an entry in the low level cache (232), the cache controller (214) will need to determine (308) whether the low level cache (232) includes an entry associated with the address (210) in shared memory (206) as described above.

Figure 4:
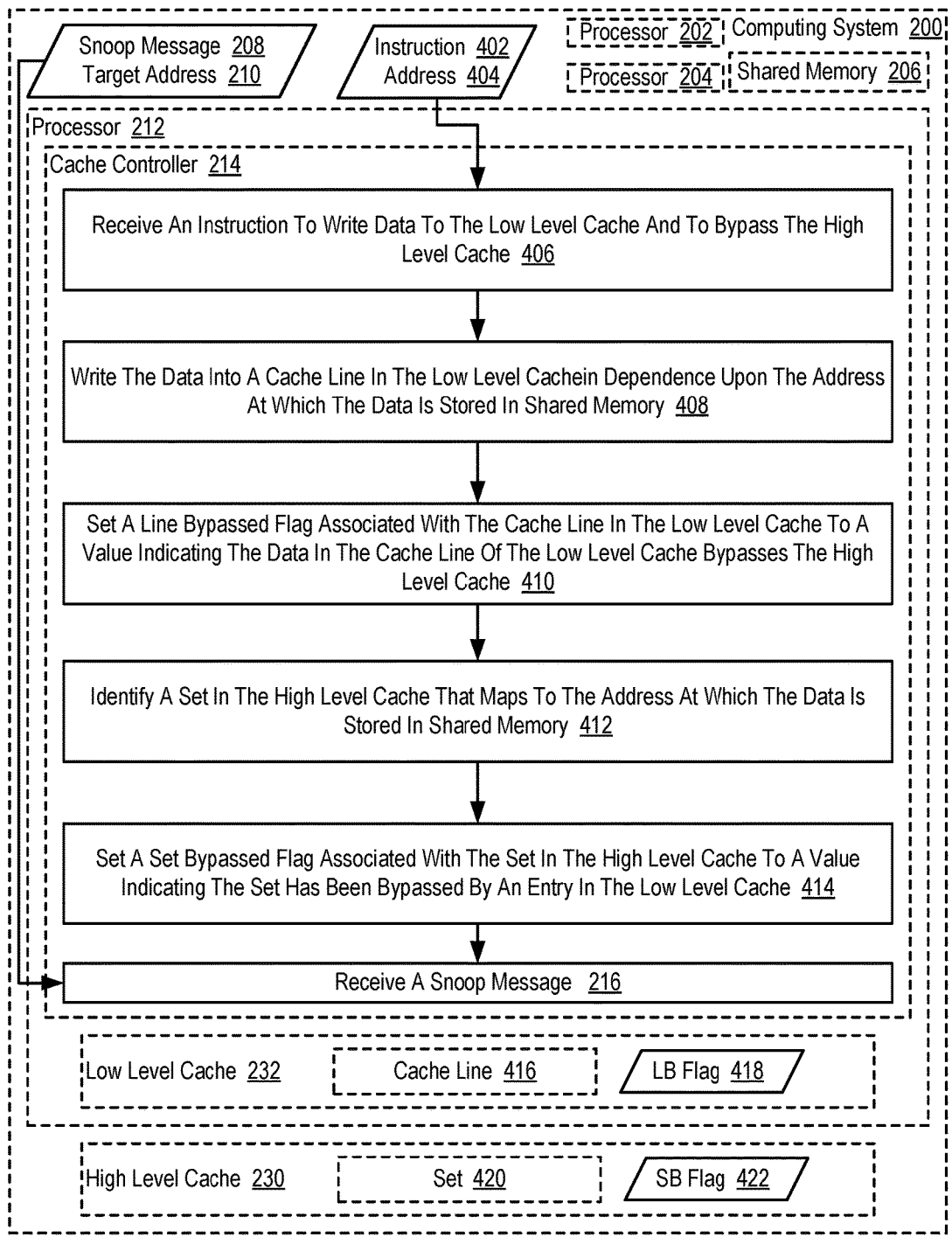
FIG. 4 sets forth a flow chart illustrating an example method for filtering snoop traffic in a multiprocessor computing system according to embodiments of the present invention.

For further explanation, FIG. 4 sets forth a flow chart illustrating an example method for filtering snoop traffic in a multiprocessor computing system (200) according to embodiments of the present invention. Although not depicted in FIG. 4, the example method described in FIG. 4 is similar to the example method of FIG. 2, as it also includes receiving (216) a snoop message (208), identifying (218 on FIG. 2) a set in the high level cache (230) that maps to the address (210) in shared memory (206), determining (220 on FIG. 2) whether the high level cache (230) includes an entry associated with the address (210) in shared memory (206), determining (224 on FIG. 2) whether the set in the high level cache (230) has been bypassed by an entry in the low level cache (232), and discarding (228 on FIG. 2) the snoop message (208).

The example method of FIG. 4 also includes receiving (406), by the cache controller (214), an instruction (402) to write data to the low level cache (232) and to bypass the high level cache (230). In the example method of FIG. 4, the instruction (404) includes an address (404) at which the data is stored in shared memory (206). The instruction (402) to write data to the low level cache (232) and to bypass the high level cache (230) may be received (406), for example, in response to an attempt to access the address (404) at which the data is stored in shared memory (206) that resulted in a cache miss where neither cache (230, 232) included a valid copy of the data. In such an example, the data may bypass the high level cache (230) because the data is a particular type that has been identified as data of a type that does not benefit from an inclusive high level cache (230) such as data that is part of a media stream which will not be accessed repeatedly.

The example method of FIG. 4 also includes writing (408), by the cache controller (214), the data into a cache line (416) in the low level cache (232). In the example method of FIG. 4, the cache line (416) is selected in dependence upon the address (404) at which the data is stored in shared memory (206). As described above, the low level cache (232) is a set associative cache such that a particular piece of data can only reside within a predetermined number of cache lines in the low level cache (232), where each cache line (416) represents a way within a set. The cache line (416) is selected in dependence upon the address (404) at which the data is stored in shared memory (206), for example, by using the least significant bits of the address as an index into the set and selecting an available cache line (416) within the set, an invalid cache line within (416) within the set, or otherwise writing (408) the data into a cache line (416) within the set in the low level cache (232).

The example method of FIG. 4 also includes setting (410), by the cache controller (214), a line bypassed flag (418) associated with the cache line (416) in the low level cache (232) to a value indicating the data in the cache line (416) of the low level cache (232) bypasses the high level cache (230). In the example method of FIG. 4, each cache line (416) in the low level cache (232) can include flag bits that are associated with the cache line (416). For example, each cache line (416) in the low level cache (232) can include a valid bits and dirty bits. The value in each bit can be used to determine the state of data contained in the cache line (416). In the example method of FIG. 4, each cache line (416) in the low level cache (232) can also include an additional control bit, referred to herein as a line bypassed flag (418).

In the example method of FIG. 4, the line bypassed flag (418) associated with each cache line (416) in the low level cache (232) can be initialized to a value of 0, indicating that contents of the cache line (416) does not include data that bypassed the high level cache (230). If the cache controller (214) receives an instruction (402) to write data to the low level cache (232) and to bypass the high level cache (230), the line bypassed flag (418) associated with the cache line (416) that the data was written (408) to can be set to 1 to indicate the data in the cache line (416) of the low level cache (232) bypasses the high level cache (230).

The example method of FIG. 4 also includes identifying (412), by the cache controller (214), a set (420) in the high level cache (230) that maps to the address (404) at which the data is stored in shared memory (206). As described above, the high level cache (230) a set associative cache such as a 2-way set associative cache, a 4-way set associative cache, an 8-way set associative cache, and so on. In such an example, each 'way' represents a location in the high level cache (230) that can contain an entry associated with a particular address. In a 2-way set associative high level cache (230), for example, an entry associated with a particular address can be located in one of two locations, whereas in an 8-way set associative high level cache (230) an entry associated with a particular address can be located in one of eight locations. A set in the high level cache (230) therefore includes all locations in the high level cache (230) for an entry associated with a particular address, such as the address (404) at which the data is stored in shared memory (206). Identifying (412) a set (420) in the high level cache (230) that maps to the address (404) at which the data is stored in shared memory (206) may be carried out, for example, by applying an indexing algorithm to the address (404). For example, the indexing algorithm may identify the set that an address (404) maps to by using the lease significant bits of the address (404), by using a predetermined set of bits in the address (404), and so on.

The example method of FIG. 4 also includes setting (414), by the cache controller (214), a set bypassed flag (422) associated with the set (420) in the high level cache (230) to a value indicating the set (420) has been bypassed by an entry in the low level cache (232). Each set (420) in the high level cache (230) can include an associated set bypassed flag (422). The set bypassed flag (422) associated with a particular set (420) in the high level cache (230) can be initialized to a value of 0, indicating that set in the high level cache (230) has not been bypassed by an entry in the low level cache (232). After the cache controller (214) receives (406) an instruction (402) to write data to the low level cache (232) and to bypass the high level cache (230), however, the set (420) in the high level cache (230) that maps to the address (404) at which the data is stored in shared memory (206) has been bypassed. In such an example, the cache controller (214) can set (414) the value of the set bypassed flag (422) associated with the set (420) in the high level cache (230) to a value of 1, indicating that the set (420) has been bypassed by an entry in the low level cache (232).

Figure 5:
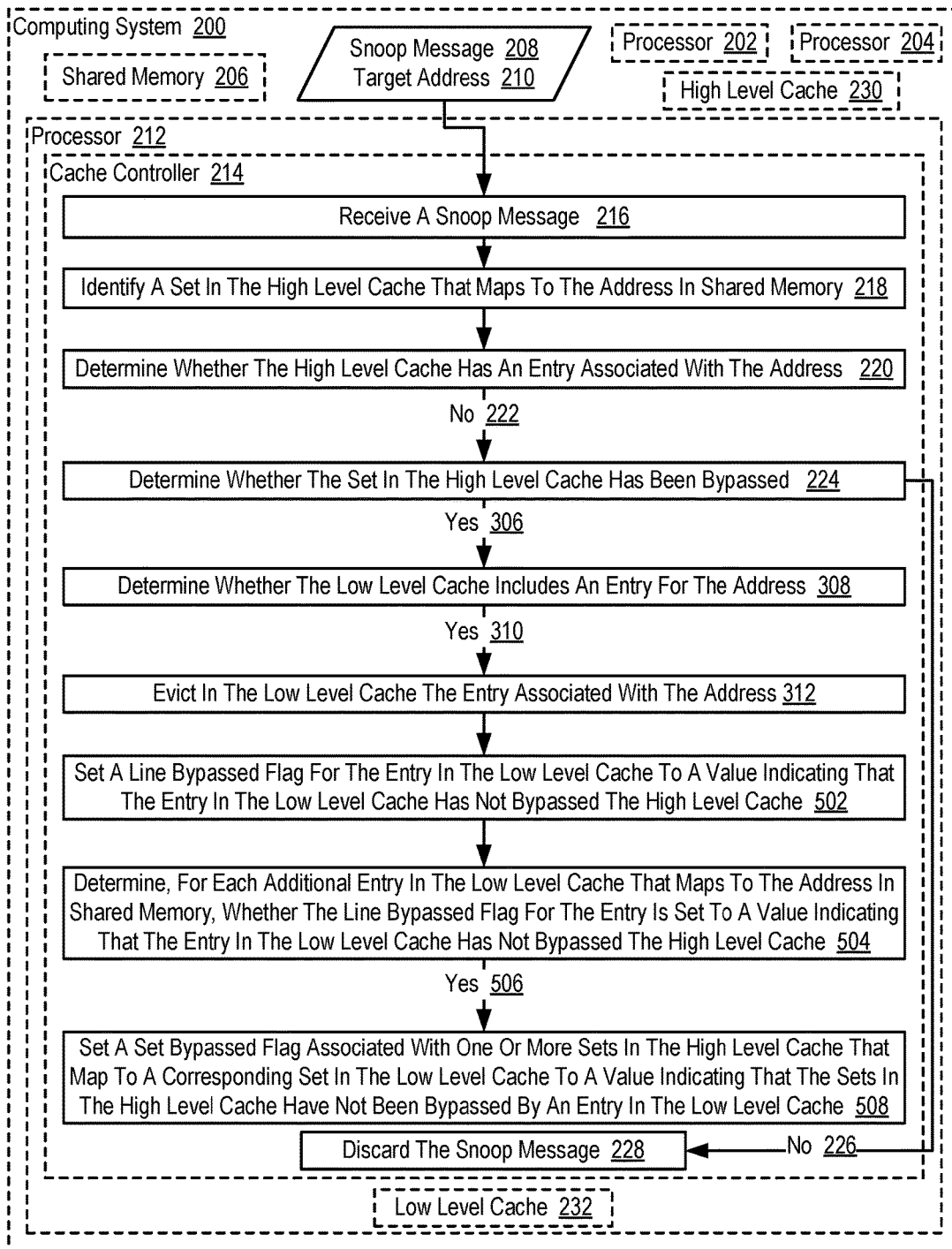
FIG. 5 sets forth a flow chart illustrating an example method for filtering snoop traffic in a multiprocessor computing system according to embodiments of the present invention.

For further explanation, FIG. 5 sets forth a flow chart illustrating an example method for filtering snoop traffic in a multiprocessor computing system (200) according to embodiments of the present invention. The example method of FIG. 5 is similar to the example method of FIG. 3, as it also includes receiving (216) a snoop message (208), identifying (218) a set in the high level cache (230) that maps to the address (210) in shared memory (206), determining (220) whether the high level cache (230) includes an entry associated with the address (210) in shared memory (206), determining (224) whether the set in the high level cache (230) has been bypassed by an entry in the low level cache (232), discarding (228) the snoop message (208), determining (308) whether the low level cache (232) includes an entry associated with the address (210) in shared memory (206), and evicting (312) in the low level cache (232) the entry associated with the address (210) in shared memory (206) in response to affirmatively (310) determining (308) that the low level cache (232) includes an entry associated with the address (210) in shared memory (206).

The example method of FIG. 5 also includes setting (502), by the cache controller (214), a line bypassed flag (418 in FIG. 4) for the entry in the low level cache (232) to a value indicating that the entry in the low level cache (232) has not bypassed the high level cache (230). In the example method of FIG. 5, setting (502) the line bypassed flag (418 in FIG. 4) for the entry in the low level cache (232) to a value indicating that the entry in the low level cache (232) has not bypassed the high level cache (230) is carried out in response to affirmatively (310) determining (308) that the low level cache (232) includes an entry associated with the address (210) in shared memory (206) and subsequently evicting (312) the entry in the low level cache (232). Because the entry in the low level cache (232) that is associated with the address (210) is being evicted (312), the line bypassed flag (418 in FIG. 4) for the entry in the low level cache (232) may be reset by setting (502) the line bypassed flag (418 in FIG. 4) for the entry in the low level cache (232) to a value indicating that the entry in the low level cache (232) has not bypassed the high level cache (230).

The example method of FIG. 5 also includes determining (504), by the cache controller (214) for each additional entry in the low level cache (232) that maps to the address (210) in shared memory (206), whether the line bypassed flag for the entry in the low level cache that maps to the address in shared memory is set to a value indicating that the entry in the low level cache (232) has not bypassed the high level cache (230). As described above, the entry in the low level cache (232) that is associated with the address (210) is evicted (312) after receiving the snoop message (208). As described above, the low level cache (232) is a set associative cache. The low level cache (232) may be, for example, a 4-way set associative cache such that an entry in the low level cache (232) that maps to the address (210) in shared memory (206) could be stored in one of four locations in the low level cache (232). In such an example, when an entry in the low level cache (232) that maps to the address (210) in shared memory (206) is evicted or otherwise invalidated after receiving the snoop message (208), the cache controller (214) may inspect the other three locations in the low level cache (232) that map to the address (210) in shared memory (206) to determine whether any entries in such a set include a line bypassed flag indicating that the entry in the low level cache (232) has bypassed the high level cache (230).

The example method of FIG. 5 also includes setting (508), by the cache controller (214), a set bypassed flag (422 in FIG. 4) associated with one or more sets (420 in FIG. 4) in the high level cache (230) that maps to a corresponding set in the low level cache (232) to a value indicating that the one or more sets (420 in FIG. 4) in the high level cache (230) has not been bypassed by an entry in the low level cache (232). In the example method of FIG. 5, the high level cache (230) may be significantly larger than the low level cache (232). The address (210) in shared memory (206) may therefore map to one set in the low level cache (232) but may also map to multiple sets in the high level cache (230). As such, when it is determined (504) that the line bypassed flag for each entry in a set in the low level cache (232) that maps to the address (210) in shared memory (206) is set to a value indicating that no entry in the set in the low level cache (232) has bypassed the high level cache (230), a set bypassed flag for one or more sets in the high level cache (230) may need to be reset. In the example method of FIG. 5, setting (508) a set bypassed flag (422 in FIG. 4) associated with one or more sets (420 in FIG. 4) in the high level cache (230) that maps to a corresponding set in the low level cache (232) to a value indicating that the one or more sets (420 in FIG. 4) in the high level cache (230) has not been bypassed by an entry in the low level cache (232) may be carried out in response to affirmatively (506) determining (504) that the line bypassed flag for each additional entry in the low level cache (232) that maps to the address (210) in shared memory (206) is not set to a value indicating that the entry in the low level cache (232) has bypassed the high level cache (230).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of filtering snoop traffic in a multiprocessor computing system, each processor in the multiprocessor computing system coupled to a shared main memory, the method comprising:
  receiving, by a cache controller, a snoop message that identifies an address in the shared memory;
  determining, by the cache controller, that a high level cache does not include an entry associated with the address in the shared memory;
  determining, by the cache controller, whether a set in the high level cache that maps to the address in the shared memory has been bypassed by an entry in a low level cache;
  responsive to determining that the set in the high level cache has not been bypassed by an entry in the low level cache, discarding, by the cache controller, the snoop message;
  receiving, by the cache controller, an instruction to write data to the low level cache and to bypass the high level cache, wherein the instruction includes an address at which the data is stored in shared memory;
  writing, by the cache controller, the data into a cache line in the low level cache, wherein the cache line is selected in dependence upon the address at which the data is stored in shared memory;
  indicating, by the cache controller, that the data in the cache line of the low level cache bypasses the high level cache;
  identifying, by the cache controller, a set in the high level cache that maps to the address at which the data is stored in shared memory; and
  indicating, by the cache controller, that the set in the high level cache has been bypassed by an entry in the low level cache.

2. The method of claim 1 further comprising responsive to determining that the set in the high level cache has been bypassed by an entry in the low level cache:
  determining, by the cache controller, whether the low level cache includes an entry associated with the address in shared memory; and
  responsive to determining that the low level cache includes an entry associated with the address in shared memory, evicting, by the cache controller, from the low level cache the entry associated with the address in shared memory.

3. The method of claim 2 further comprising responsive to determining that the low level cache includes an entry associated with the address in shared memory:
   setting, by the cache controller, a line bypassed flag for the entry in the low level cache to a value indicating that the entry in the low level cache has not bypassed the high level cache;
   determining, by the cache controller for each additional entry in the low level cache that maps to the address in shared memory, whether the line bypassed flag for the entry is set to a value indicating that the entry in the low level cache has not bypassed the high level cache; and
   responsive to determining that the line bypassed flag for each additional entry in the low level cache that maps to the address in shared memory is not set to a value indicating that the entry in the low level cache has bypassed the high level cache, setting, by the cache controller, a set bypassed flag associated with one or more sets in the high level cache that maps to a corresponding set in the low level cache to a value indicating that the one or more sets in the high level cache has not been bypassed by an entry in the low level cache.

4. The method of claim 1,
   wherein indicating, by the cache controller, that the data in the cache line of the low level cache bypasses the high level cache comprises:
      setting, by the cache controller, a line bypassed flag associated with the cache line in the low level cache to a value indicating the data in the cache line of the low level cache bypasses the high level cache; and
   wherein indicating, by the cache controller, that the set in the high level cache has been bypassed by an entry in the low level cache comprises:
      setting, by the cache controller, a set bypassed flag associated with the set in the high level cache to a value indicating the set has been bypassed by the entry in the low level cache.

5. The method of claim 1, wherein determining whether the set in the high level cache has been bypassed by an entry in the low level cache further comprises examining, by the cache controller, a set bypassed flag associated with the set in the high level cache.

6. A multiprocessor computing system with snoop traffic filtering, the computing system comprising a plurality of processors, each processor in the multiprocessor computing system coupled to a main memory that is shared among the processors, wherein the system is configured to carry out the steps of:
   receiving a snoop message that identifies an address in shared memory targeted by a write operation;
   determining that a high level cache does not include an entry associated with the address in the shared memory;
   determining whether a set in the high level cache that maps to the address in the shared memory has been bypassed by an entry in the low level cache;
   responsive to determining that the set in the high level cache has not been bypassed by an entry in the low level cache, discarding the snoop message;
   receiving an instruction to write data to the low level cache and to bypass the high level cache, wherein the instruction includes an address at which the data is stored in shared memory;
   writing the data into a cache line in the low level cache, wherein the cache line is selected in dependence upon the address at which the data is stored in shared memory;
   indicating that the data in the cache line of the low level cache bypasses the high level cache;
   identifying a set in the high level cache that maps to the address at which the data is stored in shared memory; and
   indicating that the set in the high level cache has been bypassed by an entry in the low level cache.

7. The multiprocessor computing system of claim 6 wherein the system is further configured to carry out the steps of, responsive to determining that the set in the high level cache has been bypassed by an entry in the low level cache:
   determining whether the low level cache includes an entry associated with the address in shared memory; and
   responsive to determining that the low level cache includes an entry associated with the address in shared memory, evicting from the low level cache the entry associated with the address in shared memory.

8. The multiprocessor computing system of claim 7 wherein the system is further configured to carry out the steps of, responsive to determining that the low level cache includes an entry associated with the address in shared memory:
   setting a line bypassed flag for the entry in the low level cache to a value indicating that the entry in the low level cache has not bypassed the high level cache;
   determining, for each additional entry in the low level cache that maps to the address in shared memory, whether the line bypassed flag for the entry is set to a value indicating that the entry in the low level cache has not bypassed the high level cache; and
   responsive to determining that the line bypassed flag for each additional entry in the low level cache that maps to the address in shared memory is not set to a value indicating that the entry in the low level cache has bypassed the high level cache,
   setting a set bypassed flag associated with one or more sets in the high level cache that maps to a corresponding set in the low level cache to a value indicating that the one or more sets in the high level cache has not been bypassed by an entry in the low level cache.

9. The multiprocessor computing system of claim 6,
   wherein indicating that the data in the cache line of the low level cache bypasses the high level cache comprises:
      setting a line bypassed flag associated with the cache line in the low level cache to a value indicating the data in the cache line of the low level cache bypasses the high level cache; and
   wherein indicating that the set in the high level cache has been bypassed by an entry in the low level cache comprises:
      setting a set bypassed flag associated with the set in the high level cache to a value indicating the set has been bypassed by the entry in the low level cache.

10. The multiprocessor computing system of claim 6 wherein determining whether the set in the high level cache has been bypassed by an entry in the low level cache further comprises examining a set bypassed flag associated with the set in the high level cache.

11. A computer program product for filtering snoop traffic in a multiprocessor computing system, each processor in the multiprocessor computing system coupled to a shared main memory, the computer program product disposed upon a computer readable storage medium, wherein the computer readable storage medium is not a signal, the computer program product comprising computer program instructions that, when executed, cause a computer to carry out the steps of:

receiving, by a cache controller, a snoop message that identifies an address in the shared memory;

determining, by the cache controller, that a high level cache does not include an entry associated with the address in the shared memory;

determining, by the cache controller, whether a set in the high level cache that maps to the address in the shared memory has been bypassed by an entry in a low level cache;

responsive to determining that the set in the high level cache has not been bypassed by an entry in the low level cache, discarding, by the cache controller, the snoop message;

receiving, by the cache controller, an instruction to write data to the low level cache and to bypass the high level cache, wherein the instruction includes an address at which the data is stored in shared memory;

writing, by the cache controller, the data into a cache line in the low level cache, wherein the cache line is selected in dependence upon the address at which the data is stored in shared memory;

indicating, by the cache controller, that the data in the cache line of the low level cache bypasses the high level cache;

identifying, by the cache controller, a set in the high level cache that maps to the address at which the data is stored in shared memory; and indicating, by the cache controller, that the set has been bypassed by an entry in the low level cache.

12. The computer program product of claim 11 further comprising computer program instructions that, when executed, cause the computer to carry out the steps of, responsive to determining that the set in the high level cache has been bypassed by an entry in the low level cache:

determining, by the cache controller, whether the low level cache includes an entry associated with the address in shared memory; and responsive to determining that the low level cache includes an entry associated with the address in shared memory, evicting, by the cache controller, from the low level cache the entry associated with the address in shared memory.

13. The computer program product of claim 12 further comprising computer program instructions that, when executed, cause the computer to carry out the steps of, responsive to determining that the low level cache includes an entry associated with the address in shared memory:

setting, by the cache controller, a line bypassed flag for the entry in the low level cache to a value indicating that the entry in the low level cache has not bypassed the high level cache;

determining, by the cache controller for each additional entry in the low level cache that maps to the address in shared memory, whether the line bypassed flag for the entry is set to a value indicating that the entry in the low level cache has not bypassed the high level cache; and responsive to determining that the line bypassed flag for each additional entry in the low level cache that maps to the address in shared memory is not set to a value indicating that the entry in the low level cache has bypassed the high level cache, setting, by the cache controller, a set bypassed flag associated with one or more sets in the high level cache that maps to a corresponding set in the low level cache to a value indicating that the one or more sets in the high level cache has not been bypassed by an entry in the low level cache.

14. The computer program product of claim 11, wherein indicating, by the cache controller, that the data in the cache line of the low level cache bypasses the high level cache comprises:

setting, by the cache controller, a line bypassed flag associated with the cache line in the low level cache to a value indicating the data in the cache line of the low level cache bypasses the high level cache; and wherein indicating, by the cache controller, that the set has been bypassed by an entry in the low level cache comprises:

setting, by the cache controller, a set bypassed flag associated with the set in the high level cache to a value indicating the set has been bypassed by the entry in the low level cache.

15. The computer program product of claim 11, wherein determining whether the set in the high level cache has been bypassed by an entry in the low level cache further comprises examining, by the cache controller, a set bypassed flag associated with the set in the high level cache.

* * * * *